United States Patent
Fiederling et al.

(10) Patent No.: US 10,330,527 B2
(45) Date of Patent: Jun. 25, 2019

(54) DEVICE AND METHOD FOR LIGHT CONVERSION DEVICE MONITORING

(71) Applicant: OSRAM GmbH, Munich (DE)

(72) Inventors: Roland Fiederling, Friedberg (DE);
Daniel Weissenberger, Giengen (DE);
Thomas Tessnow, Weare, NH (US)

(73) Assignee: OSRAM GMBH, Munich (DE)

( * ) Notice: Subject to any disclaimer, the term of this patent is extended or adjusted under 35 U.S.C. 154(b) by 181 days.

(21) Appl. No.: 14/675,789

(22) Filed: Apr. 1, 2015

(65) Prior Publication Data
US 2016/0290856 A1  Oct. 6, 2016

(51) Int. Cl.
| | | |
|---|---|---|
| *G01J 1/02* | (2006.01) | |
| *G01J 1/04* | (2006.01) | |
| *G01J 1/42* | (2006.01) | |
| *G01J 5/12* | (2006.01) | |
| *G01J 5/20* | (2006.01) | |
| *B60Q 11/00* | (2006.01) | |
| *F21S 41/14* | (2018.01) | |
| *F21S 41/16* | (2018.01) | |

(52) U.S. Cl.
CPC .......... *G01J 1/0238* (2013.01); *B60Q 11/005* (2013.01); *F21S 41/14* (2018.01); *F21S 41/16* (2018.01); *G01J 1/0407* (2013.01); *G01J 1/4228* (2013.01); *G01J 1/4257* (2013.01); *G01J 5/12* (2013.01); *G01J 5/20* (2013.01)

(58) Field of Classification Search
CPC ... B60Q 11/005; F21S 48/1145; G01J 1/0238; G01J 1/0407; G01J 1/4228; G01J 1/4257; G01J 5/12; G01J 5/20
See application file for complete search history.

(56) References Cited

U.S. PATENT DOCUMENTS

| | | | | |
|---|---|---|---|---|
| 5,347,201 A | * | 9/1994 | Liang | ............... G02F 1/133604 313/309 |
| 2006/0192087 A1 | * | 8/2006 | Kuszpet | ............... G01T 1/2928 250/214 R |
| 2008/0187014 A1 | * | 8/2008 | Takagi | ..................... G02F 1/37 372/36 |

(Continued)

FOREIGN PATENT DOCUMENTS

| | | |
|---|---|---|
| CN | 101529327 A | 9/2009 |
| DE | 19913766 A1 | 4/2000 |

(Continued)

OTHER PUBLICATIONS

International Search Report based on Application No. PCT/EP2016/055087(7 Pages) dated Jun. 27, 2016 (Reference Purpose Only).

(Continued)

*Primary Examiner* — Que Tan Le
*Assistant Examiner* — Jennifer D Bennett
(74) *Attorney, Agent, or Firm* — Viering, Jentschura & Partner MBB (57) ABSTRACT

A light converter for a light source is disclosed, having a substrate and a light converting layer disposed thereon for receiving laser radiation and converting the same into visible light. A sensor is functionally integrated with the light converting layer for purposes of detecting the condition of the light converting layer and modifying an operation of the laser radiation source in response thereto.

9 Claims, 4 Drawing Sheets

Fig. 4

(56) References Cited

U.S. PATENT DOCUMENTS

| | | |
|---|---|---|
| 2010/0200286 A1 | 8/2010 | Melcher et al. |
| 2010/0244705 A1* | 9/2010 | Hajjar .................. G09G 3/006 |
| | | 315/129 |
| 2011/0241549 A1 | 10/2011 | Wootton |
| 2014/0009952 A1 | 1/2014 | Nomura et al. |
| 2014/0334167 A1 | 11/2014 | Tiefenbacher |

FOREIGN PATENT DOCUMENTS

| | | |
|---|---|---|
| DE | 102006045514 A1 | 2/2008 |
| DE | 102012215702 A1 | 3/2014 |
| JP | H0341596 A | 2/1991 |
| WO | 2013096984 A1 | 7/2013 |
| WO | 2014037217 A1 | 3/2014 |
| WO | 2015197163 A1 | 12/2015 |

OTHER PUBLICATIONS

International Search Report based on application No. PCT/EP2016/055087 (18 pages) dated Sep. 23, 2016 (Reference Purpose Only).
English Translation of the Chinese Office Action including the search report based on application No. 201680021245.X (11 pages) dated May 31, 2018 (For reference purpose only).

* cited by examiner

DEVICE AND METHOD FOR LIGHT CONVERSION DEVICE MONITORING

TECHNICAL FIELD

Various embodiments relate generally to a device and method for providing a sensor, and sensor measurement. More particularly, various embodiments relate to a sensor for detecting the condition of a light converter, and a control system for responding thereto.

BACKGROUND

Conventional illumination sources, such as those used for automotive lighting, include light produced by incandescent/halogen, LED or high-intensity-discharge technology. By contrast, lighting using laser technology may meet or exceed requirements imposed by automotive regulations, but with considerable advantages in terms of size, efficiency and/or controllability of output. In one example laser radiation may be converted, such as by excitation of a phosphor, into illumination suitable for automotive headlamps.

However, unlike conventional illumination, special measures are typically necessary in laser-based devices to prevent unconverted laser light from exiting a headlamp, even in the event of a structural failure of the lamp components or a partial destruction of the lamp itself, such as might occur due to a collision. It is therefore advantageous to provide a fail-safe system for use with laser lighting, and in particular for automotive lighting.

SUMMARY

According to an embodiment describing an example 1, a light converter for a light source is disclosed having a substrate, which may be a light transmissive substrate or a light reflective substrate. The substrate has at least one light converting layer attached thereto. A sensor functionally integrated with the light converting layer serves at least in part as a first sensor layer.

According to an embodiment describing an example 2, the light converter of example 1 is described wherein the light converting layer comprises a phosphor According to an embodiment describing an example 3 the light converter of example 2 is described wherein the light converting layer comprises a first major surface and a second major surface.

According to an embodiment describing an example 4 the light converter of example 3 is described wherein the first sensor layer is disposed on the first major surface of the light converting layer.

According to an embodiment describing an example 5, the light converter of example 4 is described wherein the light converting layer is bonded to the substrate at the second major surface of the light converting layer.

According to an embodiment describing an example 6 the light converter of examples 3-5 are described wherein the light converting layer is configured to admit laser radiation via the second major surface and to emit converted visible light via the first major surface thereof. Likewise, according to an embodiment describing an example 6, the light converters of examples 3-5 are described wherein light converting layer is configured to admit laser radiation via the first major surface, emit from the second major surface, and having been reflected by the substrate, pass back through the light converter through the second major surface, and emit as converted light from the first major surface.

According to an embodiment describing an example 7, the light converter of example 6 is described wherein the first sensor layer is electrically conductive.

According to an embodiment describing an example 8 the light converter of example 7 is described wherein the first sensor layer is applied in a pattern across the first major surface.

According to an embodiment describing example 9, the light converter of example 8 is described wherein said pattern comprises a first wire.

According to an embodiment describing example 10, the light converter of example 9 is described wherein the first wire forms a meander across at least a part of the first major surface.

According to an embodiment describing example 11, the light converter of example 9 is described wherein the first sensor layer comprises a plurality of first wires.

According to an embodiment describing example 12, the light converter of example 11 is described wherein the plurality of first wires are oriented in parallel to one another.

According to an embodiment describing example 13, the light converter of example 12 is described wherein the first wires extend across the first major surface in a first direction and are separated from each other in a second direction.

According to an embodiment describing example 14, the light converter of example 13 is described wherein the first direction is orthogonal to the second direction.

According to an embodiment describing example 15, the light converter of example 11 is described wherein the plurality of first wires are U-shaped.

According to an embodiment describing example 16, the light converter of example 11 is described wherein the plurality of first wires are omega-shaped.

According to an embodiment describing example 17, the light converters of examples 15 and 16 are described wherein the plurality of first wires are nested.

According to an embodiment describing example 18, the light converters of examples 11-17 are described wherein said plurality of wires is coplanar.

According to an embodiment describing example 19, the light converters of examples 1-18 are described wherein the sensor further comprises a second sensor layer.

According to an embodiment describing example 20, the light converter of example 19 is described wherein the second sensor layer is on the first major surface of the light converting layer.

According to an embodiment describing example 21, the light converter of example 20 is described wherein the second sensor layer is electrically conductive.

According to an embodiment describing example 22, the light converter of example 21 is described wherein the second sensor layer is applied in a pattern across the first major surface of the light converting layer.

According to an embodiment describing example 23, the light converter of example 22 is described wherein the second sensor layer is disposed over the first sensor layer.

According to an embodiment describing example 24, the light converter of example 23 is described wherein the first sensor layer is electrically insulated from the second sensor layer.

According to an embodiment describing example 25, the light converter of example 24 further comprising an insulating layer disposed between the first sensor layer and the second sensor layer.

According to an embodiment describing example 26, the light converter of example 25 is described wherein the insulating layer is transparent.

According to an embodiment describing example 27, the light converter of example 26 is described wherein the second sensor layer comprises a second wire.

According to an embodiment describing example 28, the light converter of example 27 is described wherein the second wire forms a meander across at least a part of the at least one major surface of the substrate.

According to an embodiment describing example 29, the light converter of example 28 is described wherein the second sensor layer comprises a plurality of second wires.

According to an embodiment describing example 30, the light converter of example 29 is described wherein the second wires are coplanar.

According to an embodiment describing example 31, the light converter of example 30 is described wherein the plurality of second wires are oriented in parallel to one another.

According to an embodiment describing example 32, the light converter of example 31 is described wherein the second wires extend across the first major surface in a third direction and are separated from each other in a fourth direction.

According to an embodiment describing example 33, the light converter of example 32 is described wherein the third direction is orthogonal to the fourth direction.

According to an embodiment describing example 34, the light converter of example 33 is described wherein the first direction is orthogonal to the third direction.

According to an embodiment describing example 35, the light converters of examples 33 and 34 is described wherein the second direction is orthogonal to the fourth direction.

According to an embodiment describing example 36, the light converters of examples 29 and 30 are described wherein at least one of the plurality of second wires is U-shaped.

According to an embodiment describing example 37, the light converters of examples 29 and 30 are described wherein at least one of the plurality of second wires is omega shaped.

According to an embodiment describing example 38, the light converters of examples 36 and 37 are described wherein at least one of the plurality of second wires is nested.

According to an embodiment describing example 39, the light converters of examples 19 and 21-38 are described wherein the second sensor layer is on the second major surface of the light converting layer.

According to an embodiment describing example 40, the light converter of example 39 is described wherein the second sensor layer is disposed between the light transmissive substrate and the light converting layer.

According to an embodiment describing example 41, the light converters of examples 9-40 are described wherein the first and/or second wires are embedded within the light converting layer.

According to an embodiment describing example 42, the light converters of examples 9-41 are described wherein the sensor is structurally integrated with the light converting layer.

According to an embodiment describing example 43, the light converter of example 42 is described wherein a structural change of the light converting layer are measurable by the sensor.

According to an embodiment describing example 44, the light converter of example 43 is described wherein said structural change includes one of the group including cracking, dimensional deformation and dislocation of the light converting layer.

According to an embodiment describing example 45, the light converter of example 44 is described wherein the electrical characteristics of the first and/or second layer are measurably altered by said structural change.

According to an embodiment describing example 46, the light converter of example 45 is described wherein at least one of said wires is broken by the structural change.

According to an embodiment describing example 47, the light converter of example 46 is described wherein the at least one wire is broken proximal to a locus of the structural change.

According to an embodiment describing example 48, the light converter of example 45 is described wherein each of said wires has a measurable electrical resistance.

According to an embodiment describing example 49, the light converter of example 48 is described wherein said electrical resistance varies due to structural changes in the light converting layer.

According to an embodiment describing example 50, the light converters of examples 9-41 are described wherein the sensor is thermally coupled to the light converting layer.

According to an embodiment describing example 51, the light converter of example 50 is described wherein each of said wires has a measurable electrical resistance.

According to an embodiment describing example 52, the light converter of example 51 is described wherein said electrical resistance has a thermal coefficient.

According to an embodiment describing example 53, the light converter of example 52 is described wherein the temperature of the light conversion layer is proportional to said electrical resistance.

According to an embodiment describing example 54, the light converter of example 19 is described wherein the second sensor layer is electrically coupled to the first sensor layer.

According to an embodiment describing example 55, the light converter of example 54 is described wherein the electrical coupling is a capacitive coupling.

According to an embodiment describing example 56, the light converter of example 54 is described wherein the electrical coupling is an ohmic coupling.

According to an embodiment describing example 57, the light converter of example 54 is described wherein the electrical coupling is an inductive coupling.

According to an embodiment describing example 58, the light converter of examples 54-57 is described wherein the second sensor layer is disposed on the second major surface of the light converting layer.

According to an embodiment describing example 59, the light converter of example 58 is described wherein the light converting layer is excited by laser radiation.

According to an embodiment describing example 60, the light converter of example 59 is described wherein the laser radiation is configured to scan across a major surface of the light converting layer.

According to an embodiment describing example 61, the light converters of examples 59 and 60 are described wherein the excitation of the light converting layer alters an electrical characteristic of the light converting layer.

According to an embodiment describing example 62, the light converter of example 61 is described wherein the excitation can be localized by measurement of the electrical coupling of the sensor layers.

According to an embodiment describing example 63, the light converter of example 62 is described wherein damage to the light converting layer is inferred from measurement of the excitation.

According to an embodiment describing example 64, the light converters of examples 54-57 are described wherein the second sensor layer is disposed on the first major surface of the light converting layer.

According to an embodiment describing example 65, the light converter of example 64 further comprising a dielectric layer between the first and second sensor layer.

According to an embodiment describing example 66, the light converters of examples 54-57 are described wherein the second sensor layer is disposed within the light converting layer.

According to an embodiment describing example 67, the light converter of example 66 is described wherein at least a portion of the light converting layer acts as a dielectric between the first sensor layer and the second sensor layer.

According to an embodiment describing example 68, the light converter of any of the above examples is described further including a controller coupled to at least one sensor layer of the sensor.

According to an embodiment describing example 69, the light converter of example 68 is described wherein the controller provides a sensing signal to the sensor.

According to an embodiment describing example 70, the light converter of example 69 is described wherein the controller receives sensor output from the sensor.

According to an embodiment describing example 71, the light converter of example 70 is described wherein the sensor output includes signals indicative of at least one of the structure, temperature and/or excitation of the light conversion layer.

According to an embodiment describing example 72, the light converters of examples 68-71 are described wherein measurements of at least one sensor layer are made continuously by the controller.

According to an embodiment describing example 73, the light converters of examples 68-71 are described wherein measurements of at least one sensor layer are made intermittently by the controller.

According to an embodiment describing example 74, the light converter of example 73 is described wherein measurements are made in a time-chopped manner.

According to an embodiment describing example 75, the light converter of example 71-74 is described wherein the controller is configured to provide measurements at a frequency greater than 100 Hz.

According to an embodiment describing example 76, the light converters of examples 68-75 are described wherein the controller measures an electrical resistance of at least one sensor layer.

According to an embodiment describing example 77, the light converters of examples 68-76 are described wherein the controller measures an electrical capacitance of the sensor.

According to an embodiment describing example 78, the light converter of example 77 is described wherein the capacitance is measured across the first sensor layer and the second sensor layer.

According to an embodiment describing example 79, the light converter of example 78 is described wherein the capacitance is measured across the light converting layer.

According to an embodiment describing example 80, the light converter of example 50 is described wherein current applied to one or more of said wires heats the light converting layer.

According to an embodiment describing example 81, the light converter of example 80 is described wherein the temperature of the light converting layer is maintained above a threshold.

According to an embodiment describing example 82, the light converter of example 54 further comprising a controller configured to measure at least one of the first sensor layer and/or the second sensor layer.

According to an embodiment describing example 83, the light converter of example 82 is described wherein the controller is configured to detect an open circuit in at least one of the first and/or second wires.

According to an embodiment describing example 84, the light converter of example 83 is described wherein the controller is configured to control a laser radiation source.

According to an embodiment describing example 85, the light converter of example 84 is described wherein the controller changes the operation of the laser radiation source based on the measured electrical resistance.

According to an embodiment describing example 86, the light converter of example 85 is described wherein the controller changes an intensity profile of the laser radiation based on the measured electrical resistance.

According to an embodiment describing example 87, the light converter of example 85 is described wherein the controller turns off the laser radiation source in response to an open circuit.

According to an embodiment describing example 88, the light converter of example 54 further comprising a controller configured to measure the coupling across the first sensor layer and the second sensor layer.

According to an embodiment describing example 89, the light converter of example 88 further comprising a laser radiation source coupled to the controller.

According to an embodiment describing example 90, the light converter of example 89 is described wherein the laser radiation source is configured to scan a beam of laser radiation across the light conversion layer.

According to an embodiment describing example 91, the light converter of example 90 is described wherein the controller is configured to detect excitation of the light conversion layer.

According to an embodiment describing example 92, the light converter of example 91 is described wherein the controller is configured to change the operation of the laser radiation source based on the detected excitation.

According to an embodiment describing example 93, the light converter of example 91 is described wherein the controller is configured to change the intensity profile of the laser radiation based on the detected excitation.

According to an embodiment describing example 94, the light converter of example 91 is described wherein the controller is configured to turn off the laser radiation source in response to the detected excitation.

According to an embodiment describing example 95, the light converter of example 82 is described wherein the controller provides an actuator signal to at least one of the first and/or second sensor layers.

According to an embodiment describing example 96, the light converter of example 95 is described wherein the actuator signal is a heating current applied to said at least one sensor layer.

According to an embodiment describing example 97, the light converters of examples 9-96 are described wherein the first and/or second wires are 0.2 to 20 microns in width.

According to an embodiment describing example 98, the light converters of examples 9-97 are described wherein the first and/or second wires are separated from each other by a distance of 2 to 200 microns.

According to an embodiment describing example 99, the light converters of any of the preceding examples are described wherein the first and/or second sensor layers comprise ZnO and/or Indium Tin Oxide.

According to an embodiment describing example 100, the light converters of any of the above-recited examples are described wherein the first and/or second sensor layer has been applied using physical vapor deposition techniques.

According to an embodiment describing example 101, the light converters of any of the preceding examples are described wherein the first and/or second sensor layer has been deposited using sputtering.

According to an embodiment describing example 102, a method for operating a laser activated light source is described including directing a laser radiation at a light converter. In this example, the light converter includes at least one light converting layer having a major surface defining an area, and a sensor functionally integrated with the light converting layer. A condition of the light converting layer is detected by measurement of the sensor, and adjusting the laser radiation in response to the detected condition.

According to an embodiment describing example 103, the method of example 102 is described wherein the light converter comprises a layer of material containing phosphor material.

According to an embodiment describing example 104, the method of example 103 further comprising converting substantially all of the laser radiation via the phosphor material.

According to an embodiment describing example 105, the method of example 104 is described wherein the sensor includes an electrically conductive material.

According to an embodiment describing example 106, the method of example 105 is described wherein the electrically conductive material is substantially transparent.

According to an embodiment describing example 107, the method of example 106 is described wherein the electrically conductive material comprises at least one wire.

According to an embodiment describing example 108, the method of example 107 further comprising applying a sensing current to the at least one wire to measure a resistance of the wire.

According to an embodiment describing example 109, the method of example 108 is described wherein the sensor is structurally integrated with the light converting layer.

According to an embodiment describing example 110, the method of example 109 is described wherein measurement of an open circuit in the sensor corresponds to detection of structural damage in the light converting layer.

According to an embodiment describing example 111, the method of example 108 is described wherein said adjusting includes switching off the laser radiation.

According to an embodiment describing example 112, the method of example 111 further comprising locating a sub-area within said area is described wherein the detected structural damage has occurred.

According to an embodiment describing example 113, the method of example 112 is described wherein said directing includes scanning the laser radiation across at least a portion of the area of the at least one light converter.

According to an embodiment describing example 114, the method of example 112 is described wherein said adjusting includes excluding the sub-area from the scanned area.

According to an embodiment describing example 115, a method for manufacturing a light converter for a laser activated light source is described. The method includes providing a light transmissive substrate, disposing a light converting layer on the substrate, and integrating a sensor layer with the light converting layer. As described, at least one condition of the light converting layer may be detected by measurement of the sensor.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "phosphor" is intended to denote any material, including fluorescent or phosphorescent materials that are luminescent. Phosphor material can also include scattering particles such as $TiO_2$ particles. Accordingly, the above are to be considered exemplary, rather than limiting. As used herein, phosphors may convert light of one wavelength into light of a different wavelength, or from light having one set of characteristics (e.g. divergence, intensity, chromaticity, coherence polarization, spectral range (Ultraviolet, Infrared, Visible)) into light having different characteristics. The terms "light converting", "convert", "upconvert" or "downconvert" are intended to describe the function of a phosphor generally and are not considered limiting. For example, a substance that renders incoming laser radiation into light resembling that from a thermal or non-thermal source is considered a phosphor for purposes of this disclosure, even where the radiation has undergone no significant change in wavelength.

The word "functional" in the phrase "functional link", "functional integration" or "functionally integrated", etc. are used herein to denote a coupling of elements in which at least one common purpose is satisfied or at least one relevant feature of the combination is shared, directly or indirectly, across components so linked or integrated. In this manner, the link between the elements is defined by its function. For example, elements disclosed as being "thermally integrated" or "thermally coupled" are functionally integrated to the extent that heat in one component may be propagated into the other components, or where changes in temperature in one component may be detected at the other component via the link.

Likewise, "structurally integrated" components are coupled in a manner wherein structural changes in one component, such as a crack or dislocation may propagate to the linked components. Similarly, "electrically integrated" components have electrical characteristics in common, or have components that are combined in a manner such that a particular electrical characteristic may be observed in the combination. Components that combine to form a capacitor, for example, may be said to be electrically integrated.

Functional links as disclosed herein are not necessarily mutually exclusive, or inherent to each other. Components that are structurally linked may or may not also be thermally or electrically integrated. In each case, the link is defined by the manner in which the link is functionally relevant.

FIGS. 1A, 1B, 1C and 2 show a light converter 100/100'/100" (alternately referred to generally as light converter 100) for a light source according to exemplary embodiments of the disclosure. In particular, FIGS. 1A, 1B and FIG. 2, light converter 100 is shown including substrate 110, which may be formed of glass or sapphire, may be light transmissive (FIG. 1A) or reflective or opaque (FIG. 1B), and at least one light converting layer 120 attached to substrate 110. A sensor 130 is illustrated having at least one sensor layer. First sensor layer 131 is shown. Sensor 130 is functionally integrated with light converting layer 120 such that there is a coupling between sensor 130, for at least one relevant function. For example, the functional integration may be a structural integration between first sensor layer 131 and the light converting layer, wherein physical damage to the light converting layer propagates into first sensor layer 131.

Figure 1A:
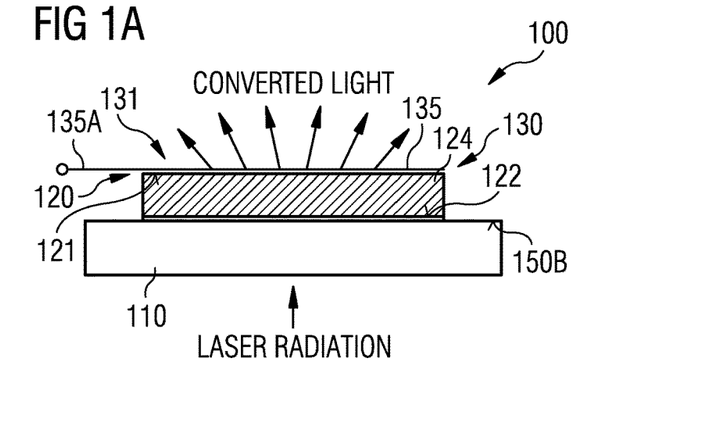
FIGS. 1A-1C. are cross-sections of embodiments of a light converter for use in converting laser light according to aspects of the disclosure.
Figure 1B:
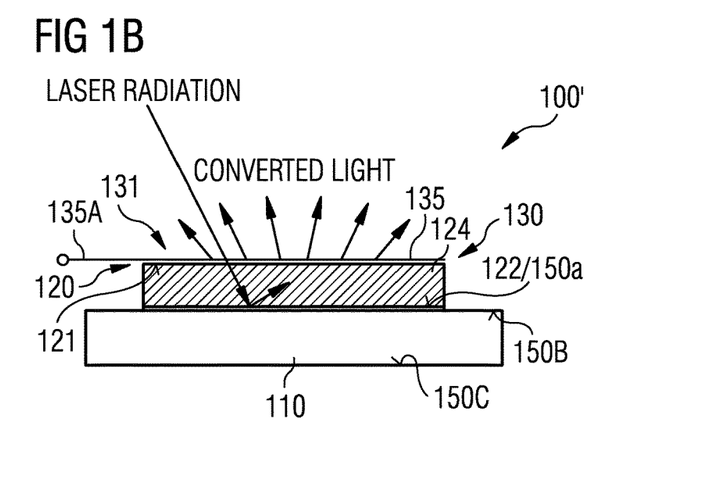
Figure 1C:
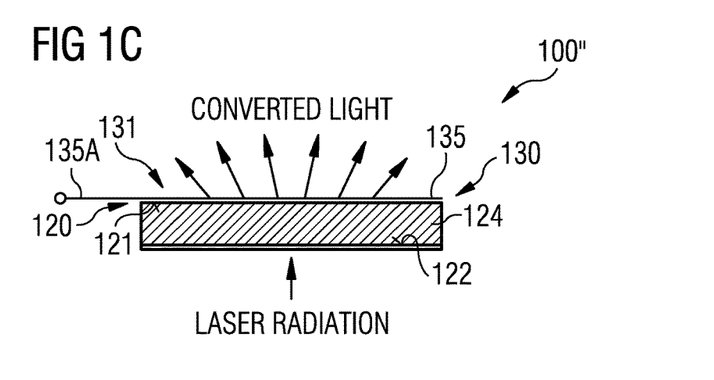
Figure 2:
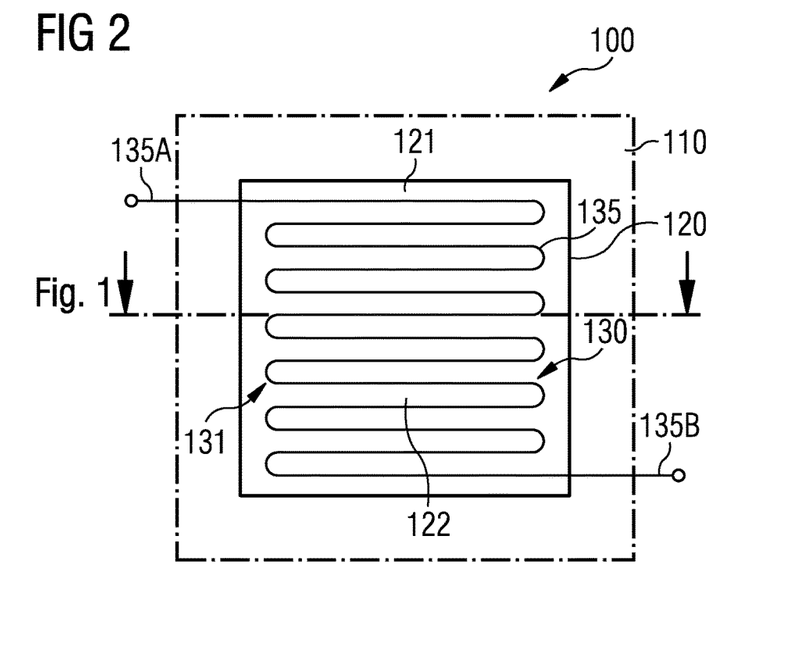
FIG. 2 is a plan view of the light converter illustrated generally in FIGS. 1A and 1B.

FIG. 1C illustrates a similar embodiment to that of FIG. 1A, however the substrate is absent. Laser radiation may pass directly through a light converting layer/light converting element 120 that is, for example, a solid state body that does not require any substrate. Light converter 100" may include light converting element 120 in the form of a disk. In particular, light converting element 120 may be a cerium-doped yttrium-aluminum garnet (Ce:YAG) phosphor element in the form of a disk. Sensor 130 may be identical to the sensor 130 shown in 1A.

I. Structural Integration

According to an embodiment, light converting layer 120 comprises a phosphor 124. More particularly, light converting layer 120 may include phosphor 124 which, when excited by laser radiation, emits light in the visible spectrum. Still more particularly, where the laser radiation may be in the blue or ultraviolet spectrum, phosphor 124 may at least partially convert, or more particularly downconvert, the laser radiation or at least a part of the laser radiation to a spectrum of visible light, for example to a yellow light, using a Cer-doped Yttrium-Aluminum-Garnet (Ce:YAG) phosphor conversion element. Yellow conversion light and residual unconverted blue laser light emitted in the same direction as the yellow conversion light form, in combination, a white light, the color coordinates of which is most preferably located inside the ECE White Field for Automotive Headlight Applications according to ECE 99 or similar regulations or industry standards.

Advantageously, adequate and appropriate phosphor is chosen to downconvert at least the majority of laser light. Alternatively, essentially all of the laser radiation will be converted, such that essentially no laser radiation (or substantially no light having the characteristics of typical laser radiation) is emitted from light conversion layer 120, due to the action of phosphor 124.

Light converting layer 120 is shown having a first major surface 121 and a second major surface 122. As shown in FIG. 1, first sensor layer 131 may be disposed on first major surface 121 of light converting layer 120. First sensor layer 131 may be formed on first major surface 121 by sputtering or vapor deposition techniques, and/or may be formed on first major surface 121 with the aid of a mask, for example a photolithographic mask.

Second major surface 122 of light converting layer 120 is covered with a light reflecting coating 150a or substrate 110 is light reflective (e.g. a sapphire substrate having a metal coating 150b/150c on its upper or lower surface). Laser radiation impinging on first major surface 121 of light converting layer 120 penetrates the light converting layer 120 and is reflected back towards first major surface 121 by means of afore-said light reflecting coating 150.

A portion of the laser radiation is converted when penetrating light converting layer 120 and all the light is scattered by phosphor particles of light converting layer 120. As a result, a mixture of converted and non-converted light is emitted via first major surface 121 of light converting layer 120. Usually, the laser generates blue light a portion of which is converted into yellow light by means of the phosphor 124 of light converting layer 120 so that whit light is emitted via first major surface 121 which is a mixture of non-converted blue light and converted yellow light. The scattering of the light, however, increases the safety of the light, by reducing its coherence.

Light converting layer 120 may be bonded to the substrate at the second major surface of the light converting layer, or may be held in place by other means. Light converting layer 120 may be formed directly on substrate 110.

Advantageously, first sensor layer 131 may be electrically and thermally conductive, and, may additionally be transparent. For example sensor layer 131 may be formed of ZnO or ITO to provide a measure of both electrical and thermal conductivity and transparency.

First sensor layer 131 may advantageously be applied in a pattern, for example as shown (in black for convenience) across first major surface 121 of light converting layer 120. As shown in more detail in FIG. 2, sensor layer 131 is shown applied as first wire 135 in a meander across first major surface 121, terminated by contacts 135A and 135B at either end. As noted above, sensor layer 131, and first wire 135, are advantageously transparent. Accordingly, and in contrast to the illustration, wire 135 would be at least partially transparent, and therefore may be obscured or partially or entirely invisible.

As understood, a wire may be any conductive trace, including a flat ribbon. Moreover, the form of the meander or pattern on the surface may be any non-overlapping shape or form, including sinusoidal, rectangular, trapezoidal, including irregular or fractal patterns such as snowflake or Koch Tree pattern, or any combination of patterns. The covered surface may be at least 50% of the conversion layer surface, preferably 60%, 70%, 80%, 90%, 95% or 99%. However, the contiguity of the layer may be minimized. In other words, a wire, such as a ribbon-like trace disposed across major surface 121 may have improved effectiveness in proportion to the length of the wire, as well as the percentage of coverage. This is particularly the case where, as noted above, the wire does not overlap at any point on a major surface, such as major surface 121.

Contiguity may also be avoided by introducing multiple layers of wires on a single major surface, separated, for example, by insulating layers. Optionally, wires from each layer may be linked in series resulting in a longer effective wire length, the multiple layers enabling potentially 100% coverage of the surface. Alternately, 4 sensor layers at each of 4 quadrants may jointly cover the entire surface area.

According to a further embodiment, light converter 100 of the present disclosure may include a plurality of first wires. For example, FIG. 3 discloses an exemplary embodiment with multiple first wires, $135_1$ to $135_n$. The plurality of wires constitute first sensor layer 131 in the embodiment of FIG. 3, wherein each separate first wire may similarly be formed of electrically and thermally conductive and/or transparent material, advantageously applied as disclosed above by deposition techniques or sputtering, with or without the aid of a mask.

First wires $135_1$ to $135_n$ may be advantageously arranged in parallel to one another, extending in a first direction and separated from each other in a second direction across first major surface 121. In this configuration, the wires are shown advantageously placed without overlapping, and the first direction is orthogonal to the second direction.

Alternately, or in addition, first wires may take other forms. For example, they may be U-shaped, omega-shaped or nested. A wide range of potential shapes and configurations is possible. Advantageously, the first wire, or wires are shown arranged in a single plane on the surface of light converting layer 120.

During operation, laser radiation entering substrate 110 as indicated in FIG. 1 passes through substrate 110 and enters light converting layer 120 at its second major surface 122, at which surface light converting layer 120 is attached. The laser radiation entering light converting layer 120 excites phosphor 124 resulting in the emission of converted light from first major surface 121.

The diameter of the laser beam can be much smaller than the diameter of the light converting layer 120. For certain applications, however, it might be beneficial to increase the diameter of the laser beam so as to meet the diameter of the light converting layer. In other applications, one or many beams of a small diameter laser radiation may be scanned with a high-frequency, for example with a 200 Hz frame rate or higher, across light converter 100 in an area corresponding to that occupied by light converting layer 120 in order to generate a dynamic irradiation pattern. Thus, a partial or the entire surface area of light converting layer 120 may be used to produce illumination in the visible light range and/or light that has fewer characteristics typical of laser light, for example if the conversion light consists of unconverted blue laser light and converted yellow light. The visible light thus converted (or combined) may safely exit a headlamp for purposes of automotive illumination, or may be used for other illumination applications.

Where the position of light converter 100 is known, and more particularly, where the position of light converting layer 120 is known, it is possible to prevent the escape of unconverted laser radiation having high intensity from light converter 100 by limiting the position of any beam of laser radiation to an area covered by light conversion layer 120. However, structural failure of light conversion layer 120, including dislocation and/or cracks in the layer may admit high power laser radiation and allow it to pass out of light converter 100 unconverted.

In case of such structural failure of light conversion layer 120, at least one of first wires 135 of first sensor layer 131 of sensor will be affected, such as by breaking, as a result of the functional integration such as the structural integration of sensor 130 with light conversion layer 120. A broken wire such as first wire 135 of FIG. 2 can be expected to detectably change the resistance of first wire 135, or to result in an easily measurable open circuit which would indicate that, in general, a structural failure of light conversion layer 120 has occurred.

In such an event, the laser radiation may be discontinued, or other action taken to prevent possible emission of unconverted laser light from light converter 100. For example, optics used to combine multiple laser sources into a single beam may be defocussed, or the laser radiation may be similarly diffused prior to irradiation of light converter 100. This action may reduce the potential for undesired escape of dangerous quantities of laser radiation due to the structural failure while maintaining some illumination by light converter 100. In automotive applications, this is known as 'limp-home' operation.

Figure 3:
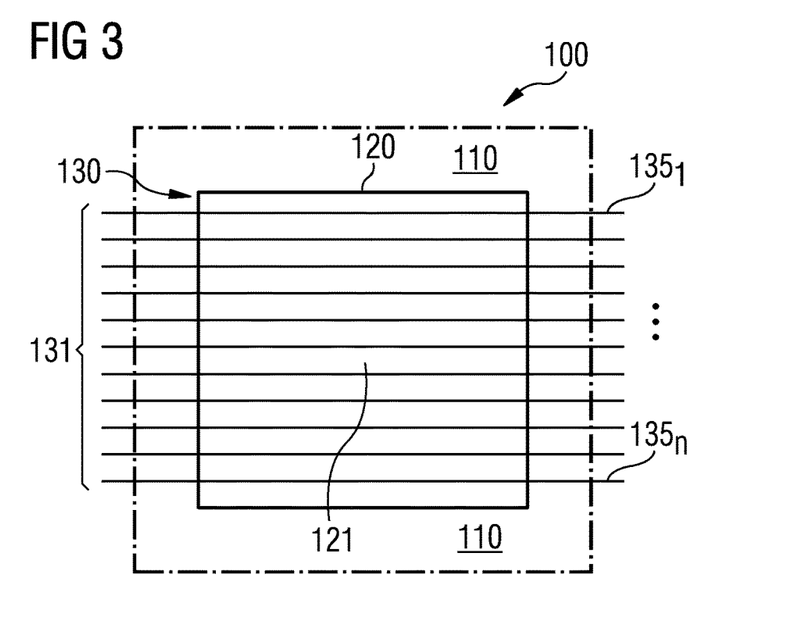
FIG. 3 is a plan view of an alternative embodiment of the light converter illustrated generally in FIG. 1.

Furthermore, where the first wire structure of FIG. 3 is employed, individual measurement of the plurality of first wires $135_1$ to $135_n$ may help to localize the structural failure. Such localization of the failure may be helpful in identifying sub-areas of light conversion layer 120 that remain sufficiently intact to permit full power laser conversion. Thus, by avoiding any sub-area of light conversion layer 120 that has been rendered potentially ineffective by structural damage, some percentage of illumination may still be safely possible.

Figure 4:
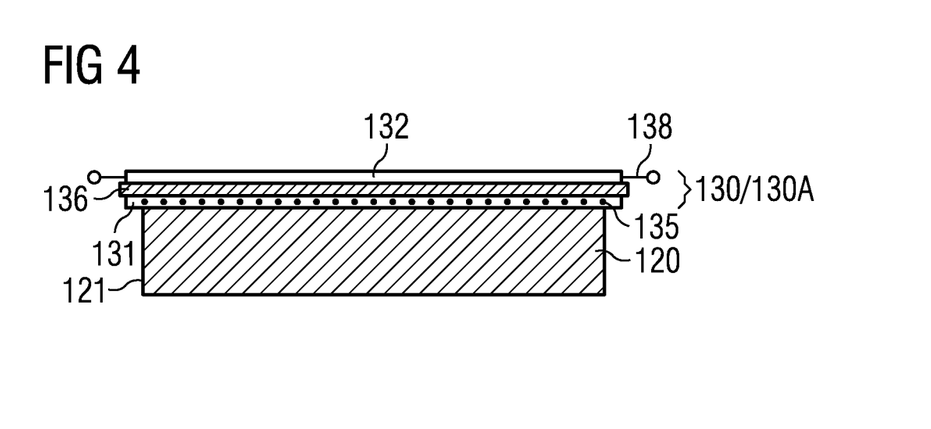
FIG. 4 is a cross-section of an embodiment of a light converter for converting laser light according to further aspects of the disclosure.
Figure 5:
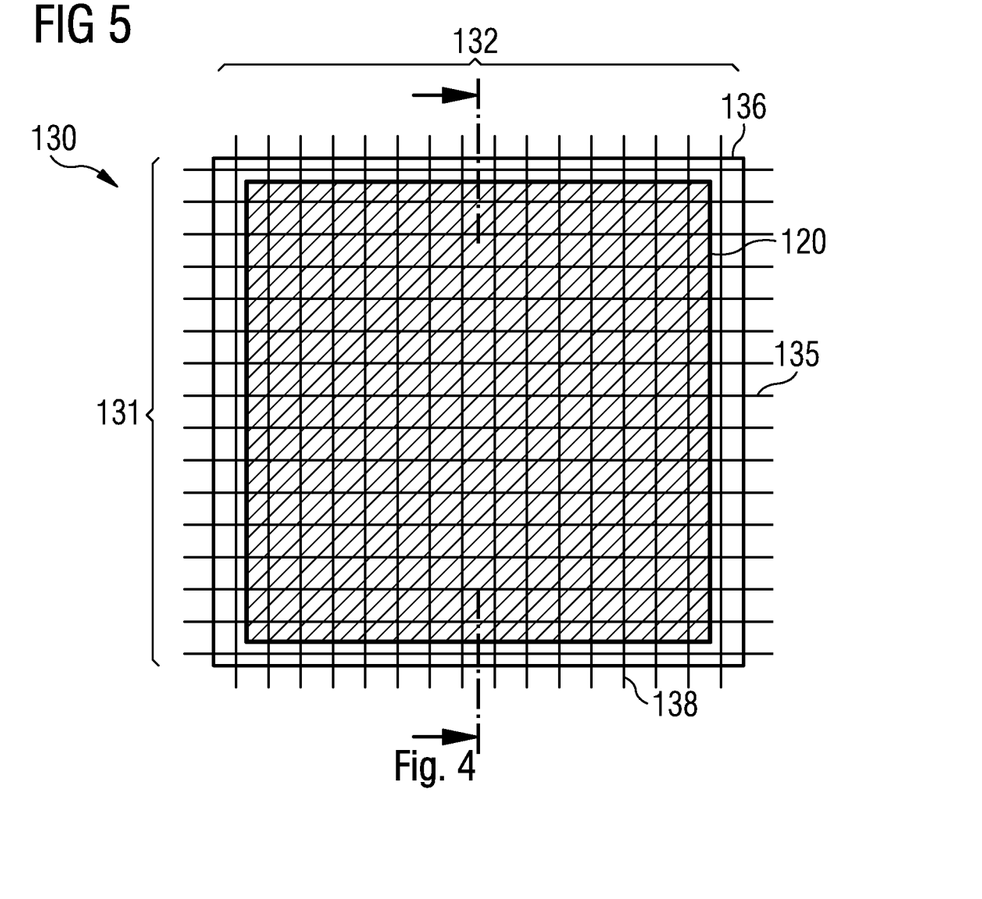
FIG. 5 is a plan view of the light converter illustrated in FIG. 4.

According to a further embodiment, sensor 130 may have a second sensor layer. FIGS. 4 and 5 show light conversion layer 120 having sensor 130 disposed on a first major surface 131 thereof. Sensor 130 is shown in FIG. 4 having first sensor layer 131 with a similar configuration to that of FIG. 3, described above, and a second sensor layer 132 disposed thereover. As shown in FIG. 5, the first wires 135 of first layer 131 are shown oriented in a first direction, and second wires 138 oriented in a second direction, essentially orthogonal to first wires 135.

Where second wires 138 are conductive, they may be formed of transparent material such as ZnO or ITO, and may be deposited in the same manner as first wires 135. Additionally, in order to prevent electrical contact between first wires 135 and second wires 138, an insulating layer 136 may be provided therebetween. By preventing short circuits at the intersection between the wires, sensor 130 provides a grid pattern which, due to its functional integration with light converting layer 120, can provide a more precise localization of, for example, dislocations or cracks in light converting layer 120.

Advantageously, insulating layer 136 is light-transmissive, or alternately is transparent. Furthermore, the precise pattern of first sensor layer 131 and second sensor layer 132 may be any shape, including U-shaped, omega-shaped, or may be for a meander or be nested.

Figure 7:
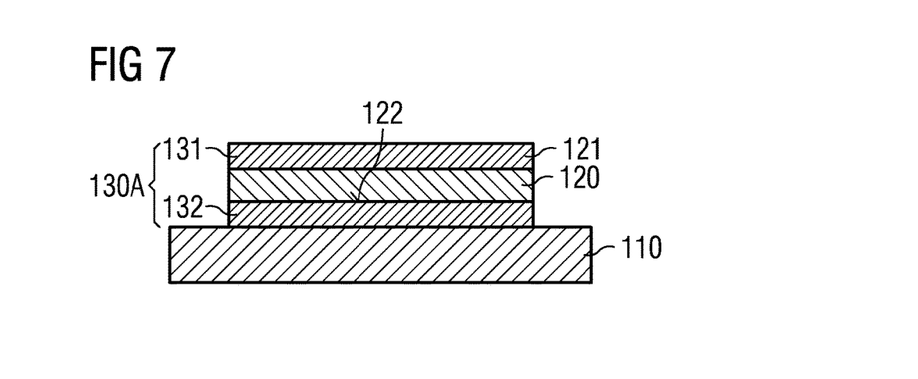
FIG. 7 is a cross section of an alternate embodiment according to further aspects of the disclosure.

Alternately, and as shown in FIG. 7, second sensor layer 132 may be disposed on the second major surface 122 of light converting layer 120. In particular, second sensor layer 132 may be disposed between substrate 110 and light converting layer 120. In a further embodiment, first wires 135 and/or second wires 138 may be embedded within light converting layer 120 for example in such a manner that they are not in physical contact with each other.

II. Thermal Integration

As noted above, sensor 130 is functionally integrated with light converting layer 120. In addition or alternatively to structural integration, sensor 130 may be thermally integrated with light converting layer 120. In particular, first wires 135 of first sensor layer 131 and/or second wires 138 of second sensor layer 132 may be coupled to light converting layer 120 in such a manner that temperature changes in light converting layer 120 may cause corresponding temperature changes in wires 135 and/or 138.

Advantageously, where wires 135, 138 have a measurable electrical resistance, and the resistance of one or more of the wires has a thermal coefficient, sensor 130, or more particularly one or both of sensor layers 131, 132 (or 131', 132') may be used as a thermocouple, for purposes of measuring the absolute or relative temperature of light converting layer 120, due to the proportionality of electrical resistance of the wires 135, 138 to their temperature, and the thermal integration thereof.

In operation, one or more of first wires 135 and/or second wires 138 may measure a temperature of light converting layer 120. A temperature signal derived from the measured resistance of one or more wires in sensor layers 131 and 132 may be used to determine, for example, whether phosphor 124 is within an optimal range, or for any other reason for which the temperature of light converting layer 120 (or other components of light converter 100 that are in thermal contact therewith) may be relevant.

Still further, where first wires 135 and/or second wires 138 are thermally integrated with light converting layer 120, the wires may be used as resistive heating elements through the application of a heating current thereto. In this manner, sensor 130 would be an actuator in addition to a sensor.

III. Electrical Integration

According to a further embodiment of the present disclosure, first sensor layer 131 and second sensor layer 132 may be electrically coupled to each other. For example, where, as in FIG. 7, light converting layer 120 is between first sensor layer 131 and second sensor layer 132, light converting layer 120 may act as a dielectric between the sensor layers, with the result that a capacitive coupling may exist between the first and second sensor layers. However, the electrical coupling may not be limited to a capacitive coupling, but may also be inductive, and possibly ohmic.

Likewise, the configuration of FIGS. 3 and 4 may be configured to be electrically integrated with light converting layer 120, either instead of, or in addition to either structurally, thermally or otherwise integrated with the layer. Where light converting layer may be said to be electrically integrated with sensor layers 131 and 132, light converting layer 120 becomes an active component in a structure including sensor layers 131 and 132, or stated a different way, light converting layer 120 may become an active part of sensor 130A, as shown in FIG. 3 and separately according to an alternate exemplary embodiment in FIG. 7.

In operation, wherein laser radiation entering light conversion layer 120 excites phosphor 124 in connection with the down-conversion or up-conversion of laser light to another spectrum or type of light suitable for the intended illumination, the excitation of conversion layer 120 may cause changes in the electrical characteristics of light conversion layer 120, and thus the corresponding measurable electrical characteristics of sensor 130A. In such an instance in may be possible to localize the excitation of phosphor 124 in light conversion layer 120. For example, scanning of a beam, or multiple beams, of laser radiation could be followed using the output of sensor 130A, in which all wires may be measured simultaneously, or according to a time-chopped approach.

Whereas the structurally integrated approach disclosed in I., above, is based on the indirect assumption that a structural defect renders the affected part of light converting layer 120 inoperative, an electrically integrated approach may support direct confirmation of illumination, as well as the location thereof. Applications of this capability include direct measurement and localization of phosphor failure in one or more subareas of light converting layer 120, but also may help diagnose problems with laser output or scanning. It may be advantageous to combine electrical and structural integration, for confirmation of safe conversion of laser radiation. Alternatively it may be advantageous to isolate electrically integrated sensor 130 from the structure of light converting layer 120 in order to prevent otherwise trivial damage from degrading the efficacy of sensor 130.

Further, where precise localization of the excitation of phosphor 124 is not required, the absence of measured excitation anywhere on light conversion layer 120 during application of laser radiation to light conversion layer 120 may be sufficient to signal that the laser is not functioning, has been misaligned, or that it has been applied to a region of light conversion layer 120 that is absent or damaged. In such an event, the laser radiation could be shut off, or directed to an undamaged portion of light conversion layer 120.

IV. Controller

Figure 6:
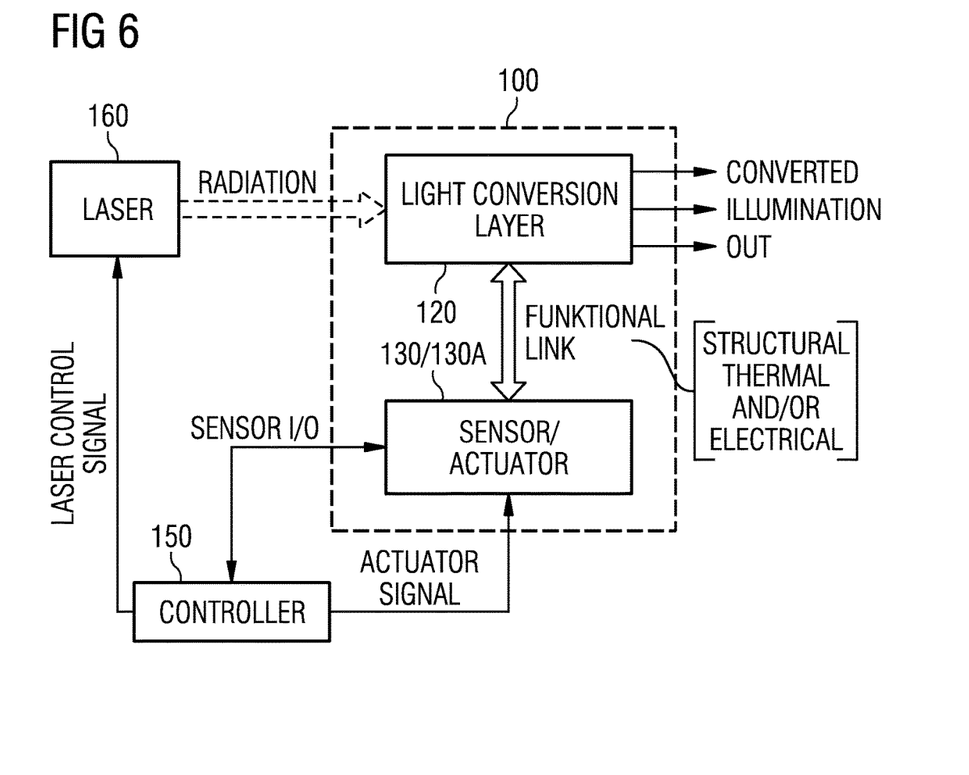
FIG. 6 is a block diagram of a system for operating a laser-based illumination source according to various embodiments.

According to a further exemplary embodiment, light converter 100 may further include a controller 150 coupled to sensor 130 and to laser 160, as shown in FIG. 6. In operation, controller 150, which may be a microcontroller, may provide a sensing signal to sensor 130/130A and receive sensor output therefrom (sensor I/O). The sensor output may include signals indicative of at least one of the structure, temperature and/or excitation of the light conversion layer, as discussed respectively above.

The measurements may be made in any manner including continuously by controller 150, or may be made intermittently, in a time-chopped manner, or for example at a frequency greater than 100 Hz. The controller may measure any measurable characteristic, including an electrical resistance of at least one sensor layer 131, 132, or an electrical capacitance of the sensor 130 or 130A such as across first sensor layer 131 and second sensor layer 132.

Controller 150 may further provide an actuator signal, or heating current to sensor/actuator 130/130A. As noted above, sensor 130 functions as an actuator in this case. Light converter 120 may in this manner be maintained above a specific range of temperatures. For example, in certain automotive applications a temperature of greater than −30 C may be required, preferably above 0 degree Celsius, or higher.

According to a further exemplary embodiment, controller 150 may measure at least one of first sensor layer 131 and/or second sensor layer 132 to detect an open circuit in one of first wires 135 and/or second wires 138, respectively. In accordance with this embodiment, controller 150 may be coupled to laser 160 to provide a laser control signal thereto which is configured to control laser 160.

In conjunction with the laser control signal, controller 150 may change the operation of laser 160 based on the measured electrical resistance of sensor layers 131 and/or 132, or more particularly in the event of an open circuit in one of first or second wires 135/138. The change may include a change in an intensity profile of the laser radiation provided to light conversion layer 120, or an alteration in the focus or scanning pattern of the laser. This can be accomplished by shifting or defocusing one or many optical components that are used to focus a laser beam onto the conversion layer. The controller may, for example, turn laser 160 off in response to the sensor output, or to operate the laser at a biologically non-harmful even in order to ensure a emergency lighting function (limp home function).

According to a further exemplary embodiment, controller 150 may be configured to measure an electrical coupling across first sensor layer 131 and second sensor layer 132. According to this embodiment, a laser radiation source may be coupled to the controller which for example, according to a laser control signal from the controller, may scan a beam of laser radiation across light conversion layer 120.

Where sensor 130A is electrically integrated with light conversion layer 120, detection of excitation of light conversion layer 120 may be detected. According to this embodiment, controller 150 may be configured to change the operation of laser 160 based on the detected excitation of light conversion layer 120.

For example, controller 150 may be configured to change the intensity profile of the laser radiation, to change the focus or scanning behavior of laser 160, or to turn the radiation beam off.

According to further exemplary embodiments, first and/or second wires 135 and/or 138 may be 0.2 to 20 microns in width.

According to further exemplary embodiments, the wires 135 and/or 138 may be separated from each other by a distance of 2 to 200 microns.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims, and all changes which come within the meaning and range of equivalency of the claims are therefore intended to be embraced.

What is claimed is:

1. A light converter for a light source comprising:
a substrate,
at least one light converting layer attached to the substrate,
a sensor functionally integrated with the light converting layer, the sensor comprising a first sensor layer and a second sensor layer,
wherein the light converting layer comprises a phosphor, a first major surface and a second major surface, and the converting layer being bonded to the substrate at the second surface,
wherein the light converting layer is configured to admit laser radiation via at least one of the first major surface and the second major surface and to emit converted visible light via the first major surface thereof,
wherein the first sensor layer is electrically conductive and applied in a first pattern oriented in a first direction across the first major surface and the second sensor layer is electrically conductive and applied in a second pattern oriented in a second direction,
wherein the first direction and the second direction differ,
wherein the first pattern comprises a first wire in a meander across said first major surface, terminated by contacts at either end, and wherein the meander is of non-overlapping shape and covers at least 50 percent of the first major surface of the converting layer.

2. The light converter of claim 1, wherein the second sensor layer is arranged on the second major surface.

3. The light converter of claim 1, wherein the second sensor layer is arranged on the first sensor layer.

4. The light converter of claim 1, wherein the second pattern comprises a second wire in a meander orthogonal to the first pattern.

5. The light converter of claim 1, wherein the sensor is thermally coupled to the light converting layer.

6. The light converter of claim 5, wherein an electrical resistance of the sensor has a thermal coefficient.

7. The light converter of claim 1, wherein the first wire is in the form of a ribbon-like trace.

8. The light converter of claim 1, wherein the first sensor layer and the first wire are transparent.

9. The light converter of claim 1, wherein the first sensor layer and/or the second sensor layer is formed of ZnO or ITO.

* * * * *